United States Patent [19]
Tyer

[11] Patent Number: 5,851,447
[45] Date of Patent: Dec. 22, 1998

[54] FLOOR-MOUNTED AERATION SYSTEM

[75] Inventor: Robert R. Tyer, Willis, Tex.

[73] Assignee: Aer Research, Inc., Humble, Tex.

[21] Appl. No.: 916,878

[22] Filed: Aug. 22, 1997

Related U.S. Application Data

[63] Continuation-in-part of Ser. No. 664,405, Jun. 17, 1996, abandoned.

[51] Int. Cl.⁶ ..................................................... B01F 3/04
[52] U.S. Cl. ....................................... 261/122.1; 261/124
[58] Field of Search ................................ 261/120, 122.1, 261/122.2, 124, DIG. 47, DIG. 70; 210/220

[56] References Cited

U.S. PATENT DOCUMENTS

| | | | |
|---|---|---|---|
| 2,221,346 | 11/1940 | Durdin, Jr. | 261/124 |
| 2,521,454 | 9/1950 | Dressler | 261/124 |
| 2,521,474 | 9/1950 | Morgan | 261/124 |
| 2,650,810 | 9/1953 | Nordell | 261/124 |
| 3,063,689 | 11/1962 | Coppock | 261/122.2 |
| 3,785,629 | 1/1974 | McKinney . | |
| 3,802,676 | 4/1974 | Thayer . | |
| 3,953,553 | 4/1976 | Thayer | 261/122.1 |
| 3,989,627 | 11/1976 | Crandall . | |
| 4,012,470 | 3/1977 | Thayer . | |
| 4,165,286 | 8/1979 | Schreiber et al. . | |
| 4,428,893 | 1/1984 | Cummings, Jr. et al. . | |
| 4,960,546 | 10/1990 | Tharp . | |
| 5,013,493 | 5/1991 | Tharp . | |
| 5,059,358 | 10/1991 | Tharp . | |

*Primary Examiner*—C. Scott Bushey
*Attorney, Agent, or Firm*—Daniel V. Thompson

[57] ABSTRACT

An aeration system for a wastewater treatment plant has a manifold for receiving compressed air, the manifold being height-adjustably attached to a wastewater treatment basin floor. The manifold has a plurality of horizontal outlets. Each outlet has a long, linear, tubular aerator extending therefrom. At least one intermediate support for the aerators is remote from the manifold, the intermediate support being height-adjustably attached to the wastewater treatment basin floor.

3 Claims, 5 Drawing Sheets

FLOOR-MOUNTED AERATION SYSTEM

CROSS-REFERENCE TO RELATED APPLICATION

This is a continuation-in-part of Ser. No. 08/664,405, filed Jun. 17, 1996, now abandoned.

TECHNICAL FIELD

The present invention relates to wastewater treatment, and more particularly to an aeration system for a wastewater treatment plant.

BACKGROUND ART

Research has confirmed that the length of perforated membrane tube diffusers has a greater effect on oxygen transfer efficiency than diameter and other variables (for a given membrane material, thickness, hardness, etc. and perforation size, shape and pattern). There presently exists a need for a aeration system that allows the use of very long diffusers.

Currently available diffuser designs are typically attached directly to a floor-mounted pipe, or to a fitting such as a tee that is directly attached to a floor-mounted pipe. This pipe serves three functions: (1) delivering air to the diffuser, (2) structurally supporting the diffuser and (3) as a method of leveling the diffusers. Diffusers in the conventional system, such as that shown in Pat. No. 4,960,546 to Tharp, apply a dynamic cantilever load on the pipe and are unsupported at their outer ends. Experience shows that the maximum allowable diffuser length in such systems is approximately three to four feet.

Thus there presently exists a need for a diffuser mounting system that permits the use of long tubular diffusers in a floor-mounted arrangement.

SUMMARY OF THE DISCLOSURE

The present invention, which I call the Line aerator system, provides for diffusers of any length, because intermediate supports reduce the cantilever to any desired length. Additionally, the continuous membrane support tube provides end restraint that allows a longer unsupported length.

My preferred embodiment of the floor-mounted Line aerator system allows the use of a single long membrane rather than multiple short membranes. This reduces the time required for installations as well as the number of membrane clamps that are required. Both the manifold end and the intermediate support end are designed to allow leveling and for easy access for replacement of membranes. The end of each membrane tube is a threaded plug which can be removed if the assembly needs to be flushed with water for cleaning.

The membrane support tube has ends that are enlarged by fittings and couplings to allow the use of the less expensive "lay-flat" membranes. Lay-flat membranes are difficult to slide on to full diameter tubes and cannot be clamped to reduced diameter tubes. With my system, the membrane slides over a tube that has a reduced diameter except at the ends where it is clamped.

The changes in diameter allow easy permanent attachment to an angle to support the manifold end. Intermediate supports allow vertical support and adjustment with rounded edges that will not cut or abrade the membrane. Vertical adjustment is achieved by use of threaded rod anchors with nuts and jam nuts.

The floor mounted version of the Line system is a marked departure from mounting the diffuser on the lateral as in conventional systems. There is no requirement for leveling the laterals. This allows less expensive lateral pipe and support systems. In some cases, the lateral could be flexible polyethylene pipe hanging on the basin wall—or even floating on or near the surface. In other words, the aerators could be completely independent of the lateral, but would still be firmly fixed and vertically adjustable. The aerators would have the advantages of maximum submergence and individual leveling, they could spread out over the basin rather than being restricted to the vicinity of the lateral, and they would be isolated from the thermal expansion of the lateral by a flexible hose from the assembly to the lateral.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
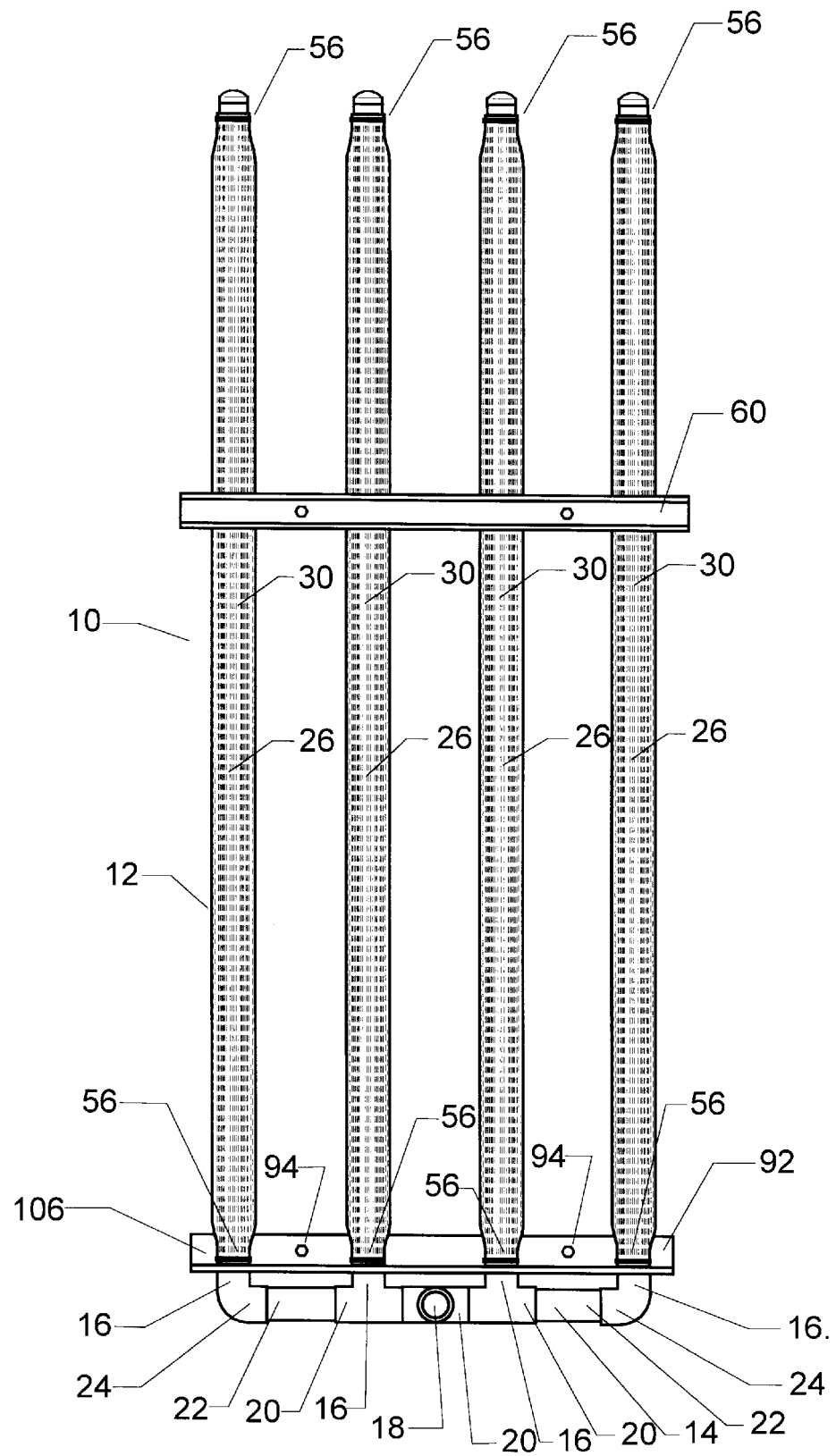
FIG. 1 is a top view of one embodiment of my invention.

Referring initially to FIGS. 1–7, Line aeration system 10 includes a plurality of diffuser assemblies 12 bolted or otherwise fixed to a floor of a wastewater treatment basin 100. Each assembly 12 includes a manifold 14 for receiving compressed air. Manifold 14 is height-adjustably attached to the wastewater treatment basin floor 100.

Each manifold 14 has a plurality of horizontal outlets 16. A compressed air inlet 18 is also provided. In the embodiment shown in FIG. 1, manifold 14 is fabricated from tees 20, nipples 22, and elbows 24.

Each outlet 16 has a long, linear tubular aerator 26 extending therefrom. Each aerator 26 includes a membrane support assembly 28 (FIG. 2) and a perforated membrane 30 sleeved over the membrane support tube 28.

Figure 2:
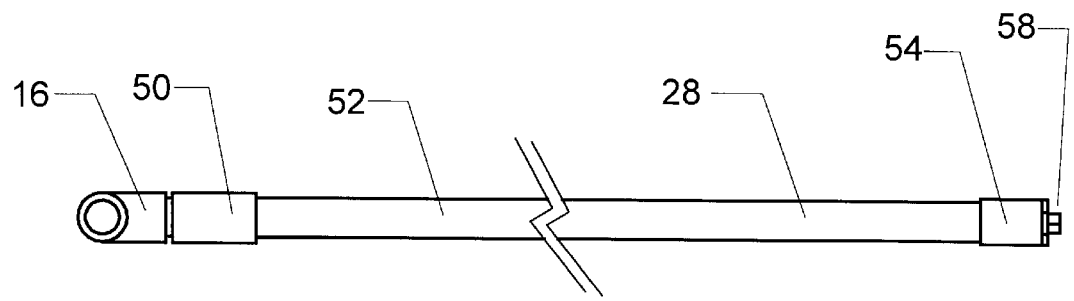
FIG. 2 is a side view of the membrane support assembly used with the system of FIG. 1.

As best shown in FIG. 2, the membrane support assembly 28 includes a fitting, which can optionally be a tee 20 or an elbow 24, connected to a coupling 50, a tube 52, and an end fitting 54. Each of the end fittings 50, 54 is larger in diameter than the membrane support tube 52. The ends of the membrane 30 are attached by clamps 56 to the end fittings 50, 54 such that the membrane 30 is easily sleeved over the relatively small diameter membrane support tube 52, yet secured, sealed attachments are made at the end fittings. A threaded plug 58 (FIG. 2) completes the aerator 26.

At least one intermediate support 60 for the aerators 30 is provided remote from the manifold 14. The intermediate support 60 is height-adjustably attached to the wastewater treatment basin floor 100.

Figure 3:
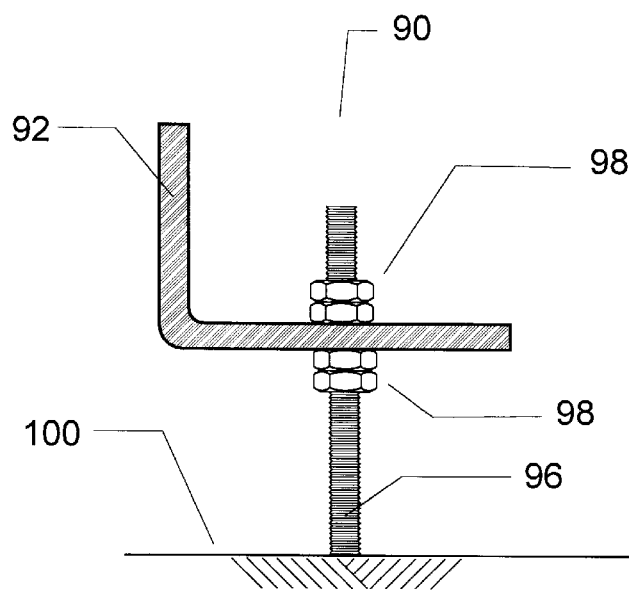
FIG. 3 is a side view of the threaded rod leveling support used with the system of FIG. 1.

FIG. 3 illustrates one embodiment of a threaded rod leveling support 90 for the manifold 14. Support 90 includes an angle 92 and a thru-hole 94 (FIG. 1). Threaded rod 96 extends through the thru-hole 94, and angle 92 is positioned on the threaded rod by way of threaded fasteners 98. The height of the angle 92 is adjustable relative the basin floor 100 by appropriate adjustment of the fasteners 98.

Figure 4:
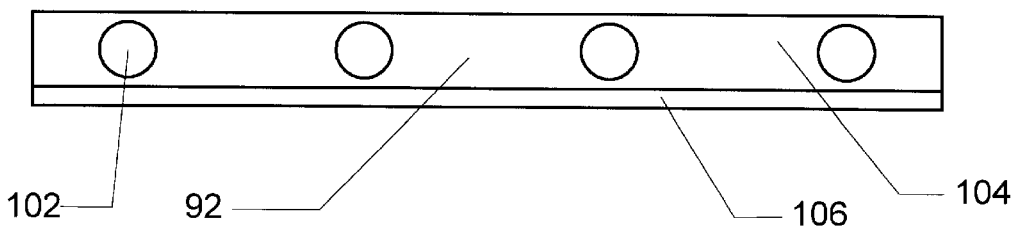
FIG. 4 is a is a front view of the manifold support angle used with the system of FIG. 1.

FIG. 4 illustrates manifold support angle 92 in greater detail. Angle 92 includes several large diameter holes 102 on the vertical flange 104 of angle 92. The horizontal flange 106 includes the thru-holes 94.

Figure 5:
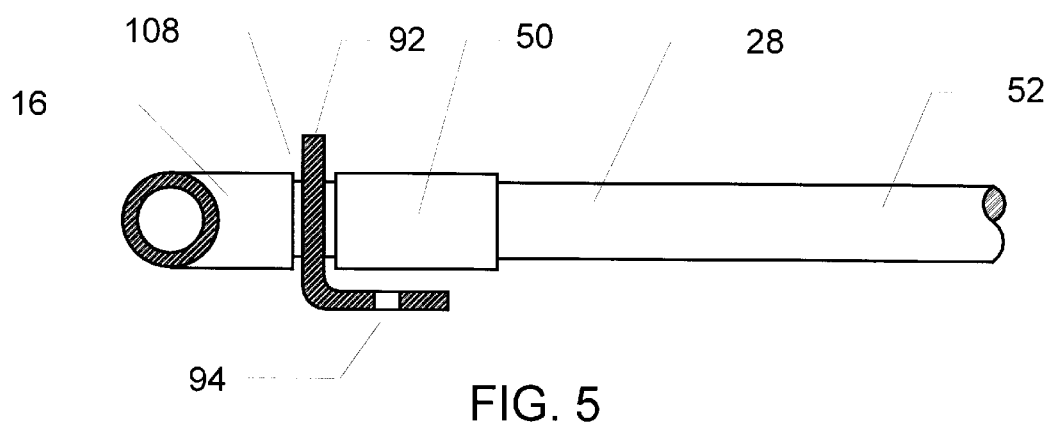
FIG. 5 is a side view showing the assembly of the parts of FIGS. 2 and 4.

As shown in FIG. 5, angle 92 is interfitted on the membrane support assembly 28 by way of a gap 108 between outlet 16 and end fitting 50.

Figure 6:
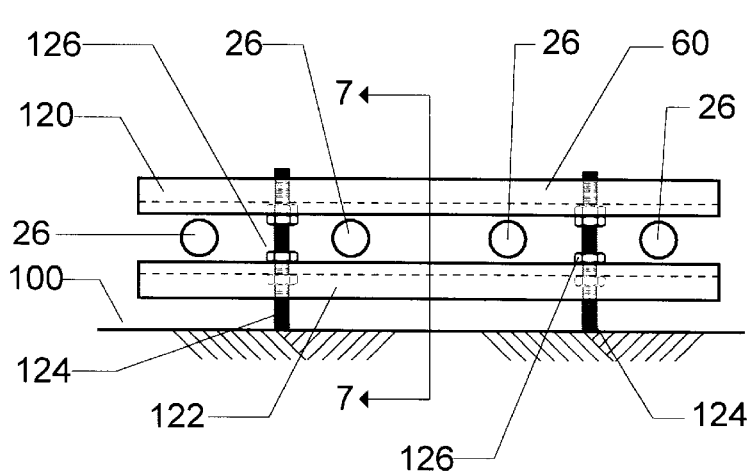
FIG. 6 is a front view of the intermediate tube support used with the system of FIG. 1.
Figure 7:
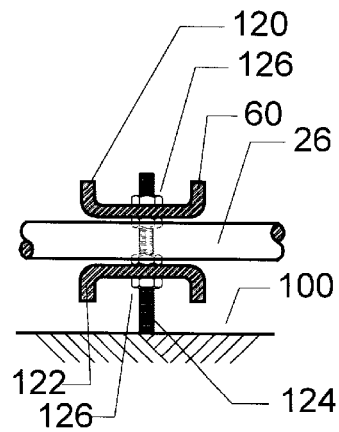
FIG. 7 is a section view taken along lines 7—7 of FIG. 6.

FIGS. 6 and 7 illustrate the construction of intermediate support 60. Support 60 includes an upwardly-facing channel section 120 and a downwardly-facing channel section 122. Aerators 26 are clamped between channels 120 and 122 by way of threaded rods 124 and threaded fasteners 126.

Figure 8:
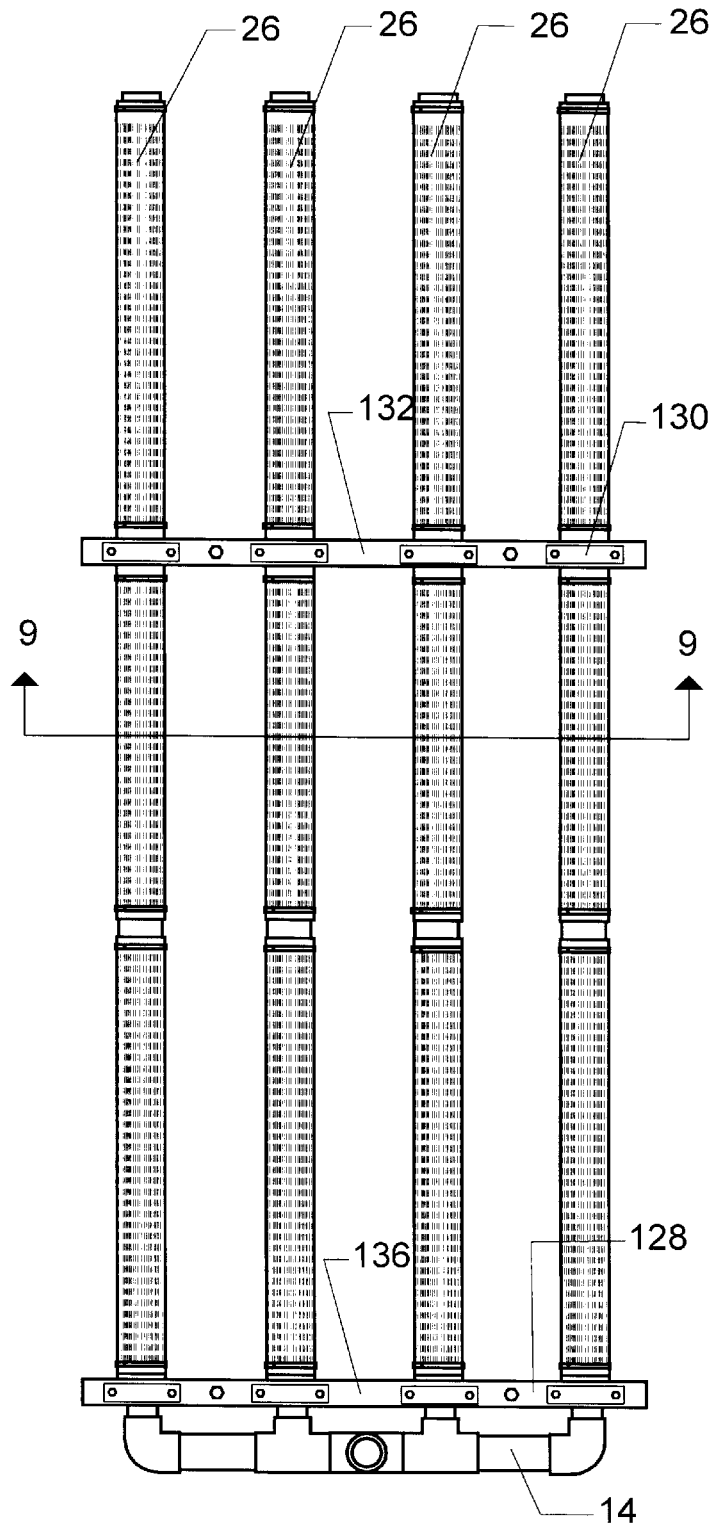
FIG. 8 is a top view of another embodiment of my invention.
Figure 9:
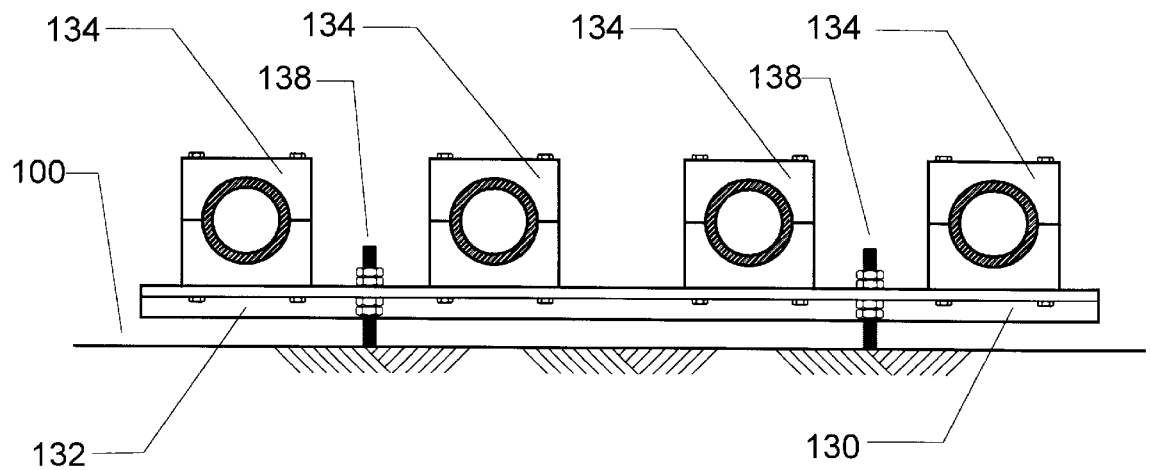
FIG. 9 is a section view taken along lines 9—9 of FIG. 8.
Figure 10:
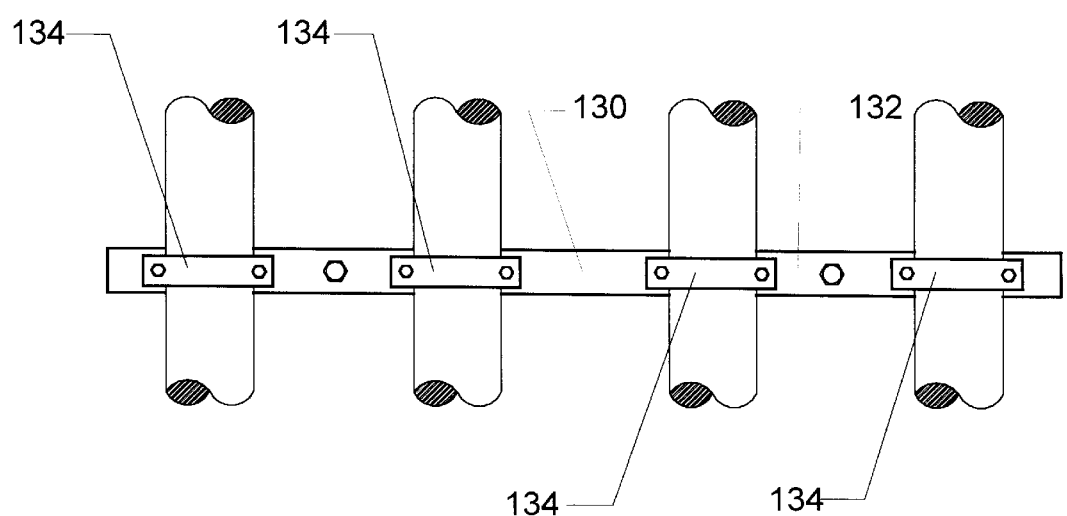
FIG. 10 is a top view of the intermediate tube support used with the system of FIG. 8.

Referring now to FIGS. 8, 9 and 10, an alternate embodiment uses a similar manifold 14 but modified diffusers 26 and supports.

Support assembly 128 for manifold 14 and intermediate support 130 are similar in construction, including an angle 132 and a plurality of split mounting blocks 134. Preferably split mounting blocks are polypropylene clamps having two thru-bolts on either side for secure mounting of the tubular diffuser. Angle 132, and its counterpart angle 136 at the manifold 14 end of system 10, are mounted to the basin floor 100 by way of threaded, height-adjustable assemblies 138.

Whereas, the present invention has been described with the respect to specific embodiments thereof, it will be understood that various changes and modifications will be suggested to one skilled in the art, and it is intended to encompass such changes and modifications as fall within the scope of the appended claims.

I claim:

1. An aeration system for a wastewater treatment plant, comprising:

a manifold for receiving compressed air, the manifold being height-adjustably attached to a wastewater treatment basin floor;

the manifold having a plurality of horizontal outlets;

each outlet having a long, linear, tubular aerator extending therefrom;

each aerator including a membrane support tube and a perforated membrane sleeved over the membrane support tube; and at least one intermediate support for the aerators remote from the manifold, the intermediate support being height-adjustably attached to the wastewater treatment basin floor.

2. The apparatus of claim 1 with an end fitting connected to the membrane support tube at each end of the membrane being larger in diameter than the membrane support tube.

3. The apparatus of claim 2 with the ends of the membrane being attached by clamps to the end fittings, such that the membrane is easily sleeved over the relatively small diameter membrane support tube, yet secure, sealed attachments are made at the end fittings.

* * * * *